(12) United States Patent
Meyer et al.

(10) Patent No.: US 6,407,351 B1
(45) Date of Patent: Jun. 18, 2002

(54) THREAD COVERING ASSEMBLY FOR ADJUSTABLE SUPPORT FEET AND THE LIKE

(75) Inventors: James C. Meyer, Tipp City; William H. McMahon, Ludlow Falls; Kinred Bowling, Dayton, all of OH (US)

(73) Assignee: Premark FEG L.L.C., Wilmington, DE (US)

( * ) Notice: Subject to any disclaimer, the term of this patent is extended or adjusted under 35 U.S.C. 154(b) by 0 days.

(21) Appl. No.: 09/408,389

(22) Filed: Sep. 29, 1999

(51) Int. Cl.[7] .......................... G01G 21/28; F16M 11/24
(52) U.S. Cl. .................. 177/238; 177/239; 248/188.2; 248/188.4; 411/542
(58) Field of Search ................ 411/535, 536, 411/542, 544; 177/124, 238, 239, 241, 243, 244; 248/188.2, 188.4

(56) References Cited

U.S. PATENT DOCUMENTS

| | | | |
|---|---|---|---|
| 269,365 A | * 12/1882 | Wood | 248/188.2 |
| 2,805,055 A | 9/1957 | Swanson | 177/238 |
| 3,137,964 A | * 6/1964 | Maslow | 248/188.2 |
| 3,175,795 A | 3/1965 | Adams | 248/188.4 |
| 3,565,377 A | 2/1971 | Schreyer | 248/188.4 |
| 3,592,423 A | 7/1971 | Mul | 248/188.4 |
| 4,108,407 A | 8/1978 | Cable et al. | 248/23 |
| 4,274,500 A | 6/1981 | Kuhnle | 177/25.11 |
| 4,458,771 A | 7/1984 | Hanssen et al. | 177/256 |
| 4,601,356 A | 7/1986 | Muccillo, Jr. | 177/211 |
| 4,632,356 A | 12/1986 | Munz | 248/638 |
| 5,288,191 A | * 2/1994 | Ruckert et al. | 411/535 |
| 5,332,182 A | 7/1994 | Weisz et al. | 248/188.4 |
| 5,340,258 A | * 8/1994 | Simon | 411/535 |
| 5,653,417 A | 8/1997 | DeBarber et al. | 177/239 |
| 5,881,979 A | 3/1999 | Rozier, Jr. et al. | 248/188.5 |
| 6,062,791 A | * 5/2000 | Simon | 411/535 |

* cited by examiner

Primary Examiner—Randy W. Gibson
(74) Attorney, Agent, or Firm—Thompson Hine LLP

(57) ABSTRACT

A thread covering assembly for threaded shafts of food equipment components such as scale adjustment feet includes at least one thread cover positioned around the threaded shaft and moveable along the length of the threaded shaft for preventing the threads of the shaft from being exposed to the environment.

18 Claims, 2 Drawing Sheets

THREAD COVERING ASSEMBLY FOR ADJUSTABLE SUPPORT FEET AND THE LIKE

FIELD OF THE INVENTION

The present invention relates generally to food equipment, and more particularly, to thread covering arrangements suitable for use on components such as adjustable support feet of food equipment such as food scales.

BACKGROUND OF THE INVENTION

Many food product scales, as is the case with other types of scales, must be properly leveled in order provide accurate weight readings. Accordingly, food product scales are provided with adjustable support feet which can be threaded into and out of the scale housing in order to level the scale. The support feet therefore include a threaded shaft which extends from the housing.

In the food equipment industry maintaining a sanitary condition of the equipment is always desirable. Food product can become lodged in exposed threads of support feet making it difficult to remove during cleaning. Covering such threads would facilitate maintenance of a sanitary environment by preventing food product from becoming lodged in the threads where it could be difficult to remove during cleaning.

Accordingly, it would be desirable and advantageous to provide a support foot assembly which has a threaded shaft for adjustment purposes but includes a suitable structure for preventing the threads from being exposed.

SUMMARY OF THE INVENTION

As used herein the terminology "threaded shaft" encompasses shafts threaded along their entire length as well as shafts threaded along only a portion of their length.

In one aspect of the present invention, an adjustable support foot assembly includes a base portion for resting upon a support surface and a threaded shaft extending from the base portion. A first thread cover is positioned around the threaded shaft between the base portion and an end of the threaded shaft. The first thread cover has at least one wall portion spaced from the threaded shaft forming a gap therebetween. A second thread cover is positioned around the threaded shaft between the base portion and the end of the threaded shaft. The second thread cover includes at least one wall portion shaped and sized to fit within the gap between the at least one wall portion of the first thread cover and the threaded shaft. At least one of the first and second thread covers is moveable along the threaded shaft to permit the first and second thread covers to be adjusted relative to each other in a telescoping manner for selectively covering different lengths of the threaded shaft.

A further aspect of the invention provides a level able scale including a housing with a plurality of support feet extending from the housing and adjustably threaded into the housing for enabling leveling of the scale. Each of the support feet includes a base portion with a shaft extending from the base portion to the housing. The shaft includes a first portion which is threaded and extends from the housing and a non-threaded second portion which extends from the threaded portion toward the base portion. At least one thread cover is threaded onto the threaded shaft and positioned between the base portion and the housing. The thread cover extends from a first end near the housing to a second end located along the non-threaded second portion of the shaft. The thread cover is adjustable along the length of the shaft for maintaining coverage of the first portion when a position of the adjustment foot relative to the housing is varied in order to level the scale.

A broader aspect of the invention provides a thread covering assembly including a threaded shaft including first and second ends. A first thread cover is positioned around the threaded shaft between the first end and the second end and has at least one wall portion spaced from the threaded shaft forming a gap therebetween. A second thread cover is positioned around the threaded shaft between the first and second ends and has at least one wall portion shaped and sized to fit within the gap between the at least one wall portion of the first thread cover and the threaded shaft. At least one of the first and second thread covers is moveable along the threaded shaft to permit the first and second thread covers to be adjusted relative to each other in a telescoping manner for selectively covering different lengths of the threaded shaft.

DETAILED DESCRIPTION OF THE EMBODIMENTS

Figure 1:
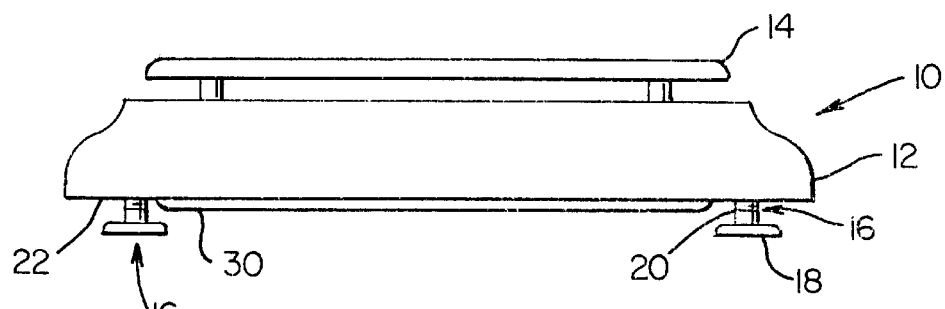
FIG. 1 is a side elevation view of a food product scale including threaded adjustment feet.

Referring to drawing FIG. 1, an exemplary scale 10 is shown including a housing 12, a product receiving tray 14 and support feet 16. The support feet 16 include a base portion 18 with a threaded shaft 20 extending from the base portion 18 to the lower surface 22 of the housing 12. As noted above, in the food environment it is desirable to cover these exposed threads.

Figure 2A:
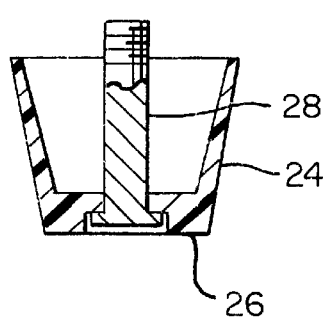
FIGS. 2A and 2B are cross-sectional views of a prior art adjustment foot configured to eliminate exposed threads
Figure 2B:
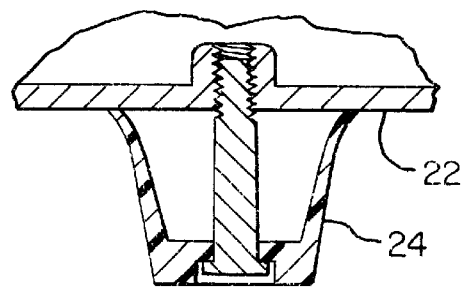

Referring to FIGS. 2A and 2B one prior art attempt to cover the threaded shaft is shown and includes a large frusto-conically shaped cover 24 formed integrally with the base portion 26 and extending upward along a part of the length of the threaded shaft 28. The threaded shaft 28 and cover 24 are fixed relative to each other and rotate together as the position of the support foot is adjusted. As shown in FIG. 2B, the cover 24 is formed of a resilient material capable of flexing when pushed against the lower surface 22 of the scale housing to enable the support foot to be threaded into and out of the housing while maintaining coverage of the threaded shaft 28. However, this support foot configuration presents a problem in scales having strengthening ribs 30 extending along the lower surface 22 of the housing in close proximity to the foot receiving openings of the housing 12 as shown in FIG. 1. The strengthening rib 30 interferes with the ability of the flexible wall of the cover 24 to seal against the housing.

Figure 3:
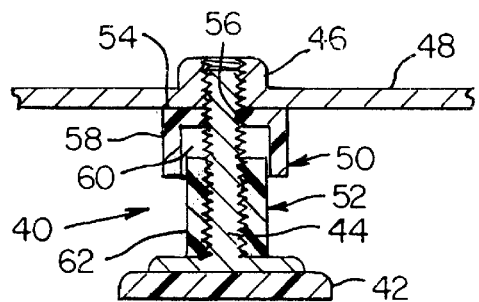
FIG. 3 is a cross-sectional view of an adjustable support foot in accordance with one embodiment of the present invention.
Figure 4:
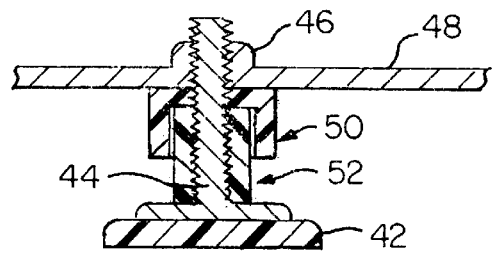
FIG. 4 is a cross-sectional view of the adjustable support foot of FIG. 3 in a different position.

As shown in FIGS. 3 and 4, one embodiment of an adjustable support foot 40 of the present invention includes a base portion 42 which may typically be formed of a hard rubber or plastic, but could also be formed of metal. A threaded shaft 44 extends from the base portion 42 into a threaded opening 46 of the scale housing 48. By rotating the support foot 40, the distance between the lower surface of the base portion 42 and the lower surface of the scale housing 48 can be varied to enable leveling of the scale. Of course, as the position of the support foot is adjusted the length of the threaded shaft 44 extending from the housing 48 varies. The thread covers 50 and 52 are provided to enable coverage of various lengths of the threaded shaft extending from the housing 48.

Upper thread cover 50 includes a top wall structure 54 which includes a threaded opening 56 for treading the cover 50 onto the threaded shaft 44. A sidewall 58 extends downward from the top wall 54 and is spaced from the threaded shaft 44 to form a gap 60 between the outer surface of the threaded shaft 44 and the inner surface of the sidewall 58. Lower thread cover 52 includes an inner opening which is also threaded for movement along the threaded shaft 44. An upper portion of the cover sidewall 62 is sized for insertion within the gap 60 formed between cover 50 and threaded shaft 44. Thus, the two covers are moveable relative to one another in a telescoping manner to cover different lengths of the threaded shaft 44 according to how far the threaded shaft 44 extends from the housing 48. In this regard, FIG. 3 depicts an arrangement in which shaft 44 extends further from the housing 48 than in the arrangement of FIG. 4.

As shown in the illustrated embodiment, it is preferred that the gap formed between the sidewall 58 and the threaded shaft 44 faces downward to receive the sidewall 62 of the lower thread cover 52. This arrangement aids in preventing ingress of food product. However, the relative positions of the telescoping thread covers could be reversed such that the gap would face upward toward the lower surface of the scale housing. In this regard, it is also preferred, but not necessary, that the inner surface of the sidewall 58 contact the outer surface of sidewall 62 in a sealing manner to prevent the ingress of fluids and food product. Preferably, both surfaces should be smooth enough to facilitate sliding movement relative to each other.

Notably, while both thread covers 50 and 52 are shown as being threaded onto the threaded shaft 44, it is recognized that only one of the thread covers might be threaded onto the shaft. For example, upper thread cover 50 could be threaded onto shaft 44 while lower thread cover 52 could be held in position relative to the upper thread cover 50 via frictional engagement between the outer surface of sidewall 62 and the inner surface of sidewall 58. The lower thread cover 52 could also be fixedly secured to the base portion by an adhesive for example, or could even be formed integrally with the base portion. Similarly, the lower thread cover 52 could be threaded onto shaft 44 while the upper thread cover 50 could be held in position relative to the lower thread cover 52 via the frictional engagement between the sidewall surfaces. Suitable frictional engagement can be achieved with relatively smooth surfaces which also permit sliding movement by a machine user. Further, rather than being threaded onto the shaft 44 the inner surface of the thread cover openings could be sized for frictional contact with the shaft threads enabling the covers 50 and 52 to hold a stationary position along the threaded shaft 44 unless moved by a scale operator.

Figure 5:
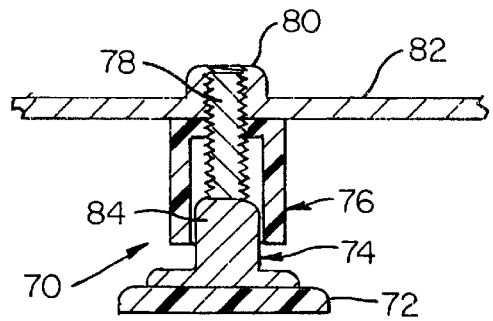
FIG. 5 is a cross-sectional view of an adjustable support foot in accordance with another embodiment of the present invention.

Referring now to FIG. 5, an adjustable support foot 70 is shown including base portion 72, shaft 74, and thread cover 76. Shaft 74 includes a threaded portion 78 extending from opening 80 in housing 82 and a non-threaded portion 84 extending from threaded portion 78 to base portion 72. Thread cover 76 is threaded onto shaft portion 78 and includes a sidewall 86 which extends downward over the full length of shaft portion 78 and at least partially over shaft portion 84. In this arrangement, if support foot 70 is threaded further out of opening 80 to expose a greater length of shaft portion 78, thread cover 76 can be moved upward along the shaft 74 adjacent the housing 82 and still cover the full length of shaft portion 78 which extends from the housing 82. Thus, coverage of the threaded portion 78 is maintained as the position of the support foot 70 relative to the housing 82 is varied.

Figure 6:
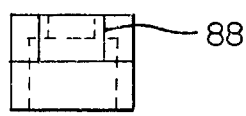
FIG. 6 is a side elevation view of a cover member including a hexagonally shaped outer surface portion for facilitating rotation by a wrench.
Figure 7:
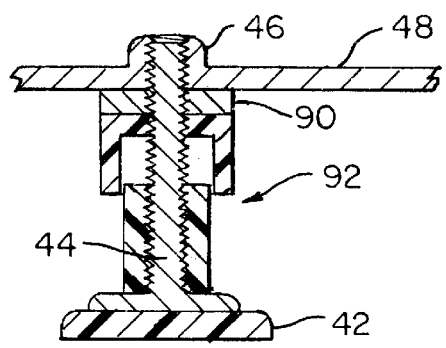
FIG. 7 is a cross-sectional view of a thread covering assembly in association with a securing nut.

In order to secure the position of an adjustable support foot relative to the scale housing, the thread cover (50 in FIGS. 3 and 4 and 76 in FIG. 5) can be tightened up against the lower surface of the housing to which the support foot is attached. In order to achieve this benefit the particular thread cover will need to be threaded onto the support foot shaft and will preferably include an outer surface portion shaped to receive a wrench for tightening purposes as shown by the hexagonal outer surface shape depicted at portion 88 of FIG. 6. Alternatively, a separate securing nut 90 can be provided as shown in FIG. 7, with the thread covering assembly 90 positioned around the threaded shaft, below the securing nut 90. In this configuration, the securing nut 90 can be tightened up against the lower surface of the housing in order to prevent unwanted rotation of the support foot. When adjustment of the support foot is desired, the securing nut is rotated away from the housing enabling rotation of the threaded shaft for such adjustment. A similar securing nut 90 could be provided above the thread cover of FIG. 5.

While the illustrated embodiments depict thread covers formed of a polymeric material such as plastic, it is recognized that other known materials could be utilized, including metals. In such cases, it may be desirable to provide a sealing member between the two telescoping thread covers, such as an o-ring positioned in an annular detent in the inner surface of sidewall 58 of thread cover 50. While the base portion of the illustrated support feet comprises a structure with an enlarged surface contacting area, the term "base portion" is intended to broadly encompass the exposed end of the support foot and could be comprised of an exposed end of the foot shaft.

Although the invention has been described and illustrated in detail it is to be clearly understood that the same is intended by way of illustration and example only and is not intended to be taken by way of limitation. For example, the thread covers could be incorporated into support feet for types of food equipment other than scales. Further, the thread covers could be incorporated into other food equipment components having exposed threads, such as adjustment knobs or handles. Accordingly, the spirit and scope of the invention are to be limited only by the terms of the appended claims.

What is claimed is:

1. An adjustable support foot assembly, comprising:
   a base portion for resting upon a support surface;
   a threaded shaft extending from the base portion;
   a first thread cover positioned around the threaded shaft between the base portion and an end of the threaded shaft, and having at least one wall portion spaced from the threaded shaft forming a gap therebetween, the gap facing the base portion;
   a second thread cover positioned around the threaded shaft between the base portion and the first thread cover, and having at least one wall portion shaped and sized to fit within the gap between the at least one wall portion of the first thread cover and the threaded shaft;

at least the first thread cover threaded for movement along the threaded shaft to permit the first and second thread covers to be adjusted relative to each other in a telescoping manner for selectively covering different lengths of the threaded shaft; and wherein at least a portion of the first thread cover includes a hexagonal outer surface shape for receiving a wrench for facilitating rotation of the first thread cover to act as a locking nut for the support foot assembly.

2. The adjustable support foot assembly of claim 1 wherein both the first and second thread covers are moveable along the threaded shaft.

3. The adjustable support foot assembly of claim 2 wherein both the first and second thread covers are threaded onto the threaded shaft.

4. The adjustable support foot assembly of claim 1 wherein an outer surface portion of the first thread cover is shaped to receive an adjustment wrench.

5. An adjustable support foot assembly, comprising:

a base portion for resting upon a support surface;

a threaded shaft extending from the base portion;

a first thread cover positioned around the threaded shaft and having at least one wall portion spaced from the threaded shaft forming a gap therebetween;

a second thread cover positioned around the threaded shaft and having at least one wall portion shaped and sized to fit within the gap between the at least one wall portion of the first thread cover and the threaded shaft;

at least one of the first and second thread covers is threaded for movement along the threaded shaft to permit the first and second thread covers to be adjusted relative to each other in a telescoping manner for selectively covering different lengths of the threaded shaft, wherein the at least one thread cover which is threaded for movement along the threaded shaft is positioned between the other thread cover and an end of the threaded shaft opposite the base portion, permitting the at least one thread cover to act as a locking nut during use;

wherein an outer surface of the at least one wall portion of the second thread cover is smooth and an inner surface of the at least one wall portion of the first threaded cover is smooth, for facilitating sliding movement between the two surfaces during telescoping adjustment of the first and second thread covers.

6. The adjustable support foot assembly of claims 5, wherein both the first and second thread covers are threaded onto the threaded shaft.

7. The adjustable support foot assembly of claim 5, wherein the first thread cover is positioned between the second thread cover and the end of the threaded shaft, the gap facing toward the base portion of the support foot, and the first thread cover acting as the locking nut during use.

8. A levelable scale, comprising:

a housing;

at least one support foot extending from the housing and adjustably threaded into the housing for enabling leveling of the scale, the support foot including:

a base portion;

a threaded shaft extending from the base portion to the housing, the threaded shaft movable relative to the housing;

a first thread cover positioned around the threaded shaft between the base portion and the housing, and having at least one wall portion spaced from the threaded shaft forming a gap therebetween;

a second thread cover positioned around the threaded shaft between the base portion and the housing, and having at least one wall portion shaped and sized to fit within the gap between the at least one wall portion of the first thread cover and the threaded shaft;

at least one of the first and second thread covers threaded for movement along the threaded shaft to permit the first and second thread covers to be adjusted relative to each other in a telescoping manner for selectively covering different lengths of the threaded shaft; and wherein the at least one thread cover which is threaded for movement along the threaded shaft is positioned between the other thread cover and the housing for facilitating operation of the at least one thread cover as a locking nut for the support foot when the at least one thread cover is rotated against the housing.

9. The scale of claim 8 wherein both the first and second thread covers are moveable along the threaded shaft.

10. The scale of claim 8 wherein both the first and second thread covers are threaded onto the threaded shaft.

11. The scale of claim 9 wherein the first thread cover is positioned between the second thread cover and the housing, the gap facing toward the base portion of the support foot.

12. The scale of claim 8 wherein an outer surface portion of the first thread cover is shaped to receive an adjustment wrench for tightening the first thread cover against the housing.

13. A levelable scale, comprising:

a housing;

an adjustment foot including:

a base portion;

a shaft extending from the base portion to the housing, the shaft including a first portion which is threaded and extends from the housing and a non-threaded second portion which extends from the shaded portion toward the base portion;

at least one thread cover threaded onto the threaded shaft and positioned between the base portion and the housing, the thread cover extending from a first end near the housing to a second end located along the non-threaded second portion of the shaft, the thread cover adjustable along the length of the shaft for maintaining coverage of the first portion when a position of the adjustment foot relative to the housing is varied in order to level the scale; and means threaded on the shaft for locking the position of the adjustment foot relative to the scale housing.

14. A levelable scale, comprising:

a housing;

an adjustable support foot including:

a threaded shaft including first and second ends, the fist end threaded into the housing for movement relative thereto;

a first thread cover positioned around the thread between the first end and the second end, the first thread cover having at least one wall portion spaced from the threaded shaft forming a gap therebetween;

a second thread cover positioned around the threaded shaft between the first and second ends, the second thread cover having at least one wall portion shaped and sized to fit within the gap between the at least one wall portion of the first thread cover and the threaded shaft;

at least one of the first and second thread covers moveable along the threaded shaft to permit the first and second thread covers to be adjusted relative to each other in a telescoping manner for selectively covering different lengths of the threaded shaft; and means threaded on the shaft for locking the position of the threaded shaft relative to the housing.

15. An adjustable support foot assembly for scales, comprising:

a threaded shaft;

a first thread cover positioned around the threaded shaft and having at least one wall portion spaced from the threaded shaft forming a gap therebetween;

a second thread cover positioned around the threaded shaft and having at least one wall portion shaped and sized to fit within the gap between the at least one wall portion of the first thread cover and the threaded shaft;

at least one of the first and second thread covers moveable along the threaded shaft to permit the first and second thread covers to be adjusted relative to each other in a telescoping manner for selectively covering different lengths of the threaded shaft;

wherein an outer surface of the at least one wall portion of the second thread cover is smooth and an inner surface of the at least one wall portion of the first threaded cover is smooth, for facilitating sliding movement between the two surfaces during telescoping adjustment of the first and second thread covers; and means threadedly movable along said shaft for acting as a locking nut.

16. The assembly of claim 14 wherein the means for locking comprises a third member separate and distinct from both the first thread cover and the second thread cover, the third member threaded onto the shaft and positioned adjacent only one of the first thread cover or the second thread cover.

17. The assembly of claim 14 wherein the means for locking comprises the first thread cover being threaded for movement along the shaft and including an outer surface portion shaped to receive a wrench to permit the first thread cover to tightened against the housing.

18. The assembly of claim 13 wherein the means for locking comprises the first thread cover being threaded for movement along the shaft and including an outer surface portion shaped to receive a wrench to permit the first thread cover to tightened against the housing.

* * * * *

UNITED STATES PATENT AND TRADEMARK OFFICE
CERTIFICATE OF CORRECTION

PATENT NO. : 6,407,351 B1  
DATED : June 18, 2002  
INVENTOR(S) : James C. Meyer et al.

It is certified that error appears in the above-identified patent and that said Letters Patent is hereby corrected as shown below:

<u>Column 5,</u>  
Line 51, the word "claims" should be -- claim --

<u>Column 6,</u>  
Line 25, after the word "claim 8" should be -- 9 --  
Line 27, after the word "claim 9" should be -- 8 --  
Line 42, the word "shaded" should be -- threaded --  
Line 61, the wording "positioned around the thread" should read -- positioned around the threaded shaft --

Signed and Sealed this

Fifteenth Day of October, 2002

*Attest:*

*Attesting Officer*

JAMES E. ROGAN  
*Director of the United States Patent and Trademark Office*

UNITED STATES PATENT AND TRADEMARK OFFICE
CERTIFICATE OF CORRECTION

PATENT NO.    : 6,407,351 B1
DATED         : June 18, 2002
INVENTOR(S)   : James C. Meyer et al.

It is certified that error appears in the above-identified patent and that said Letters Patent is hereby corrected as shown below:

Column 5,
Line 51, the word "claims" should be -- claim --

Column 6,
Line 25, after the word "claim" change "8" to -- 9 --.
Line 27, after the word "claim" change "9" to -- 8 --.
Line 42, the word "shaded" should be -- threaded --
Line 61, the wording "positioned around the thread" should read -- positioned around the threaded shaft --

This certificate supersedes Certificate of Correction issued October 15, 2002.

Signed and Sealed this

Twelfth Day of August, 2003

JAMES E. ROGAN
*Director of the United States Patent and Trademark Office*